(12) United States Patent
Yakshtes et al.

(10) Patent No.: US 8,297,510 B1
(45) Date of Patent: Oct. 30, 2012

(54) MATHEMATICAL METHOD OF 2D BARCODE AUTHENTICATION AND PROTECTION FOR EMBEDDED PROCESSING

(76) Inventors: Vladimir Yakshtes, Moscow (RU); Anatoliy Shishkin, Potomac, MD (US)

( * ) Notice: Subject to any disclaimer, the term of this patent is extended or adjusted under 35 U.S.C. 154(b) by 0 days.

(21) Appl. No.: 13/173,642

(22) Filed: Jun. 30, 2011

(51) Int. Cl.
*G06K 9/80* (2006.01)
(52) U.S. Cl. .................................. 235/462.1
(58) Field of Classification Search ............... 235/462.1, 235/462.01, 462.07, 494
See application file for complete search history.

(56) References Cited

U.S. PATENT DOCUMENTS

| | | | | |
|---|---|---|---|---|
| 2004/0026510 | A1* | 2/2004 | Cheung et al. | 235/462.1 |
| 2004/0206821 | A1* | 10/2004 | Longacre et al. | 235/462.07 |
| 2006/0071077 | A1* | 4/2006 | Suomela et al. | 235/462.01 |
| 2006/0157574 | A1* | 7/2006 | Farrar et al. | 235/494 |
| 2008/0245868 | A1* | 10/2008 | Berkun | 235/462.1 |
| 2012/0006894 | A1* | 1/2012 | Pruden et al. | 235/454 |

* cited by examiner

*Primary Examiner* — Daniel Hess
(74) *Attorney, Agent, or Firm* — Young & Thompson

(57) ABSTRACT

Mathematical method and algorithms for protecting 2D Barcode symbol from counterfeiting and encoded data from tampering with. The algorithms are based on Digital Signature concept, employ Reed-Solomon Error Correction mechanism built into the 2D Barcodes, and designed for embedded processing. The method is based on symmetrical encryption and makes use of the two independent key-exchange protocols. Encryption/decryption algorithms are built into the standard encoding/decoding schemes and result in almost no additional processing time.

9 Claims, 3 Drawing Sheets

MATHEMATICAL METHOD OF 2D BARCODE AUTHENTICATION AND PROTECTION FOR EMBEDDED PROCESSING

FIELD OF THE INVENTION

The present invention is generally related to the mathematical methods and algorithms that are designed for encoding/decoding data into/from barcode symbols and for protecting it from counterfeiting. More particularly, the present invention is directed to developing a mathematical method of 2D (two-dimensional) barcode authentication and encryption, utilizing digital signature concept, and suitable for embedded processing. The method employs error correction mechanism built into the 2D barcodes.

BACKGROUND OF THE INVENTION 2D barcodes derive their name from the traditional 1D barcodes, consisting of a set of vertical bars or stripes of varying widths and spacing. 2D barcodes, on the contrary, consist of 2D arrays of rectangles or dots. The most commonly used 2D symbologies are the so-called Data Matrix, QR Code, and PDF417—all of them employing Reed-Solomon error correction code.

2D barcodes, designed to carry certain information about products on which they are used, have become an important component in counterfeiting and anti-counterfeiting efforts. "Track and trace" through an "information" label is a main application for the barcode industry. Upgrading this "information" barcode with protective, anti-counterfeiting features is a natural extension—from tracking an individual item throughout the value chain with a barcode to using that same system and that same barcode to ensure that all products within the value chain are authentic. Protecting labels that are already circulating in the supply chain, instead of building separate product protection systems, makes this approach very cost effective.

Accordingly, there is a need in Auto ID (Automatic Identification and Data Capture) industry for barcode authentication technology to combat counterfeiting and to protect product integrity employing the existing barcode information infrastructure.

One of the widely used concepts of data authentication is the concept of digital signature. A digital signature scheme allows one to sign an electronic message and later the produced signature can be validated by the owner of the message or by any verifier. This concept employs asymmetric cryptography and is covered by a number of international and domestic standards. These include for example ISO/IEC 14888 and ISO/IEC 9796, which specify digital signature mechanisms with appendix and with message recovery, respectively. Additionally, DSS (Digital Signature Standard), issued by the National Institute of Standards and Technology (NIST), specifies a suite of algorithms which can be used to generate a digital signature.

A digital signature is computed using a set of rules and a set of parameters such that the identity of the signatory and integrity of the data can be verified. An algorithm provides the capability to generate and verify signatures. Signature generation makes use of a private key to generate a digital signature. Signature verification makes use of a public key which corresponds to, but is not the same as, the private key.

Because asymmetric key algorithms are nearly always very computationally intensive direct use of this concept for barcode applications is not practical or even feasible. In most "field" applications, the barcode decoding algorithm is embedded into the digital signal processing ("DSP") platform (for example, a scanner), having limited computational resources. Running cryptographical software on such devices would make decoding processes slow if not impossible.

In addition, digital signature mechanisms with appendix generate a message authentication code ("MAC", sometimes called a tag) to the message to be authenticated, effectively increasing the length of the message and, as a result, the size of the encoded symbol. This creates a problem for applications where the space for the symbol is limited, particularly for DPM (Direct Part Marking) applications. A hash function is used in this process to obtain a MAC tag.

Furthermore, utilizing cryptographical software in addition to the encoding/decoding software, makes the combined product more expensive and substantially more difficult to deploy. It would be preferable to build an authentication mechanism into an existing encoding/decoding algorithm as an optional "security feature".

SUMMARY OF THE INVENTION

It is one object of the present invention to provide a technology capable of authenticating 2D barcodes and ensuring integrity of the encoded data that would be fast and effective enough to be suitable for embedded processing.

It is another object of the present invention to provide an authentication algorithm that would be built into the existing encoding/decoding algorithm as an optional "security feature".

It is an additional object of the present invention to build authentication technology for 2D barcodes utilizing existing redundancy of these codes, provided by a built-in error correction mechanism, to ensure that the size of the encoded symbol to be authenticated is not increased as the result of the digital signature transformation.

It is yet a further object of the present invention to provide authentication technology for 2D barcodes that would allow these barcodes to be readable by any standard, third party decoding software thus precluding a potential attacker from even knowing that the barcode is protected.

It is another object of the present invention to provide encryption protection of a 2D barcode that would be fast and effective enough to be suitable for embedded processing.

BRIEF DESCRIPTION OF THE DRAWINGS

The following description of the invention refers to the accompanying drawings described below.

DETAILED DESCRIPTION OF THE 2D BARCODE AUTHENTICATION ALGORITHM

Figure 1:
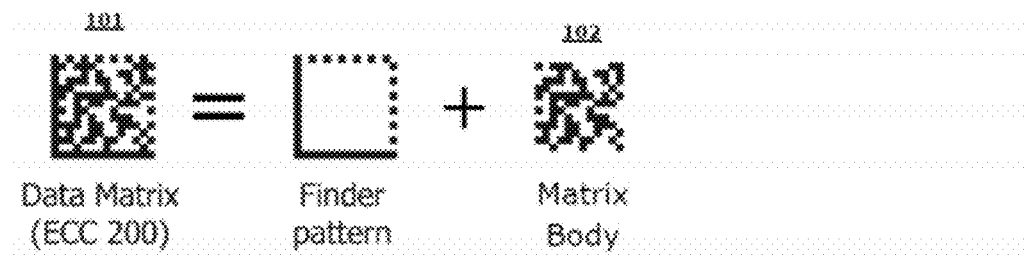
FIG. 1 depicts the structure of the example 2D barcode—Data Matrix—to be authenticated.

FIG. 1 depicts the structure of an exemplary 2D barcode—Data Matrix 101—to be authenticated. Other barcodes according to the invention may look different but have, in essence, similar components/elements, as follows:

Matrix Body 102—binary representation of Data and Error Correction Code. Patterns and service modules are excluded.

Module—single cell used to encode one bit of data in Matrix.

Codeword—is an element of a standardized code or protocol. Each code word is assembled in accordance with the specific rules of the code and assigned a unique meaning. In Reed-Solomon error correction code the codeword consists of several modules in Matrix Body. The location of a codeword is defined by an appropriate symbology standard.

Authentication Codeword (ACW)—as suggested in this document—one or several codewords (tags), that have been modified in accordance with an authentication algorithm (ACW algorithm). Both encode and decode software use the same ACW algorithm to calculate the location of ACW tags.

I. Barcode Authentication

This invention proposes to employ a modified digital signature concept to solving the problem of 2D barcode authentication. The modification includes:

Making use of a symmetric key algorithm (as computationally much less intensive) integrated into the encoding/decoding algorithm.

Making use of substitute algorithm for hash function utilizing redundancy provided by Reed-Solomon error correction mechanism. In this case "external" (MAC) tag (appendix to the message) can be replaced with "internal" tags—Authentication Codewords (ACW), situated "within" the body of Matrix.

Figure 2:
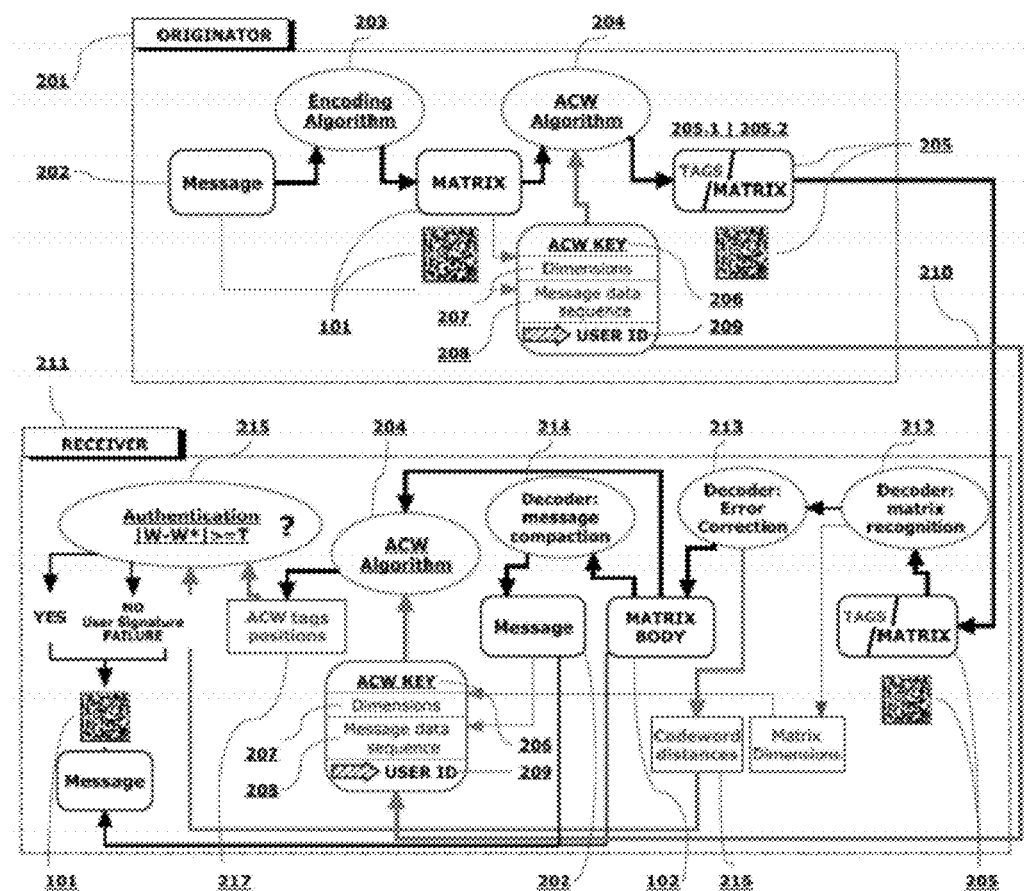
FIG. 2 depicts the proposed Protocol for Matrix authentication utilizing shared-key digital signature mechanisms.

FIG. 2 depicts the authentication protocol proposed for matrix authentication.

The originator 201 of a barcode (matrix) 101 encodes message 202 utilizing encoding algorithm 203 and runs it through an ACW algorithm 204 to produce an ACW data tag 205.1, resulting in one or another codeword being inverted. For instance, if a codeword is 10110100 then the ACW that would be produced by bit inversions is 01001011. In other words, the Hamming distance between those codewords for data matrix is set to be equal to 8 (number of bits in a codeword).

Mathematically, the ACW transformation looks like this:

$$W^* = W^\wedge E,$$

Where $W^*$—ACW tag, $W$—regular codeword, $E$ is a codeword containing 1 in every bit, logical operator "$^\wedge$" ("exclusive or") is defined by the table

| $^\wedge$ | 1 | 0 |
|---|---|---|
| 1 | 0 | 1 |
| 0 | 1 | 0 |

Positions of ACW tags 205.1 depend on an authentication key 206, which in turn is calculated using the message encoded data sequence 208, matrix dimensions 207 and shared key 209 (referenced as "User ID"), subject to a key-exchange protocol 210 between originator 201 and receiver 211. The Key generator is based on a random number generator (RNG) that uses all these data as the input parameters. The length of this data string might be from 368 up to 2048 bits. Since the authentication key 206 depends on the encoded data sequence 208 it is different for every matrix 101 going through the algorithm 204.

Each and every ACW tag 205.1 is marked via inversion to distinguish it from the regular codeword. The number of ACW tags should be somewhat lower than error correction capacity of the matrix 101, so a decoding algorithm 212-214 would be able to restore encoded data 202 and identify positions of ACW tags 205.1 in the matrix body 102 at the receiving end.

There are three components of the decoding algorithm (decoder), which are particularly important in describing presented authentication/protection mechanism:

Matrix recognition 212—finding matrix pattern within the image and calculating matrix dimensions. If no matrix pattern is found algorithm stops.

Error correction 213—restoring matrix body. Codeword distances can be calculated at this step. If number of errors exceeds error correction capacity, matrix is considered undecodable.

Message compaction 214—restoring alphanumeric message (if two previous steps are successful).

When modified matrix 205, containing the ACW tag 205.1, is sent to the receiver 211, the sequence of events concluding the authentication protocol looks as follows:

1. The matrix 205 runs through a matrix recognition 212 (to calculate matrix dimensions 207) and error correction mechanism 213 and every "raw" codeword (before error correction) is compared with the "corrected" one (after error correction). The Hamming distance for every couple of "raw" and "corrected" values of codewords is calculated and stored it in special array 216 (this array will be needed at the last step of this protocol).

2. Corrected matrix body now goes through the message compaction algorithm 214 to restore the sequence of encoded data 208. This parameter along with matrix dimensions 207, calculated earlier, and shared key 209, received from the originator 201, are used to calculate the authentication key 206.

3. Using this authentication key 206 the matrix is then run through the same ACW algorithm 204 as at the originator end 201, to determine the positions of ACW data tags 205.1—effectively, creating the second set of ACW tags, which replicates the "primary" one that was embedded into the matrix body 102 by the originator 201.

4. After calculating "primary" tag positions, one can determine the average Hamming distance $|W^*-W|$ between "raw" and "corrected" ACW tags at those positions, selecting them from the array calculated in step 1 216. Due to probable errors in the restored matrix code these distances may not necessarily be equal to the originally set distance (8 bits in data matrix example), but it has to be greater than certain threshold "T", which depends on the matrix size. If $|W-W^*| \geq T$ the receiver 211 can safely assume that the integrity of the matrix was not compromised, and the matrix 101 was not altered or tampered with during transmission.

As it is always a case with the symmetric-key algorithms, the single secret key (User ID)—which must be shared and kept private by both originator and receiver—is a subject of a certain key-exchange protocol 210. If this protocol is compromised the whole scheme may become disfunctional.

II. Barcode Protection

This invention proposes to strengthen the authentication mechanism for some particularly sensitive applications by building one more layer of protection by means of an additional encryption algorithm (on top of authentication) and establishing an alternate key-exchange protocol. This algorithm shall also satisfy the embedded processing requirements.

Figure 3:
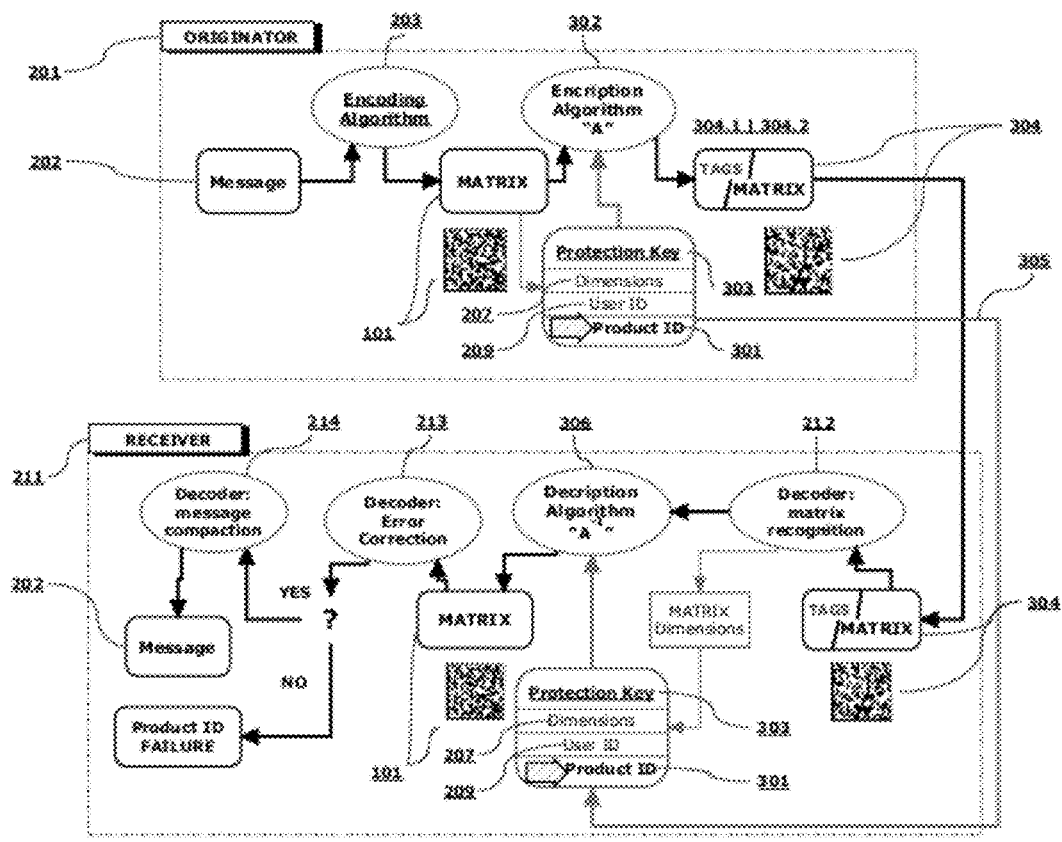
FIG. 3 depicts the proposed Protocol for Matrix protection from being copied and from being read by unauthorized person utilizing the encryption mechanism similar to digital signature algorithm.

FIG. 3 depicts the encryption algorithm, proposed as additional tool for matrix protection.

In contrary to the authentication method the idea behind this approach is to controllably transform the matrix body 102 beyond its error correction capacity, making resulting matrix 304 not decodable by any person not having a special key 301 (Product ID) or by any third party software. However, the essence of this transformation is still the same—bits inversion—just number of ACW tags 304.1 in resulting matrix 304 is substantially greater compare with authentication algorithm (205.1 tags in matrix 205).

The encryption algorithm 302 (referenced here as transformation "A") is essentially a random number generator (RNG) that calculates the random steps within the bit sequence of the matrix body 102, built by encoding algorithm 203. Operator "A" 302 uses these pseudo-random numbers like steps between module positions within this sequence and inverts the bit's value of every module in generated subsequence at each step. These random numbers must be selected to be between 1 and 7, to make number of transformed modules greater than matrix 101 redundancy and, as a result, make it unreadable. Optionally, additional RNG can be used to shift starting point of step process within matrix body 102 to further enhance algorithm safety against potential attacker.

Operator "A" must also satisfy some requirements:
It should not change the patterns and service modules.
It should not change module average density.
In PDF417 the codeword clusters should not be changed.

Keeping patterns and service data unchanged is very important to ensure that the decoding algorithm 212-213 would be able to recognize the matrix 101 and form the matrix body 102 at the receiving end 211.

The protection key 303, which operator "A" requires to build the step-by-step transformation, depends on three parameters to increase algorithm safety, namely: Product ID 301 (Product Serial number, Part No. or any arbitrary number), User ID 209 and matrix dimensions 207. Product ID 301 represents an additional secret exchange key established within the alternate key-exchange protocol. The key length is selected between 368 and 2048 bits.

Unlike to the previous approach, the input data sequence can not be used for the protection key, because the matrix is unreadable until the inverse operator "$A^{-1}$" is applied.

Applying this operator on the receiving end 211 means, again, generating RNG-numbers, using the protection key 303, and moving along module subsequence restoring value of modules in inversed positions. Since logical Operator "A" is defined as an "exclusive or" transformation, Operator "$A^{-1}$" is equal to "A" in this case.

Obviously, this algorithm alone protects barcode from being decoded by unauthorized person.

III. Combined Algorithm

A combined algorithm, employing both digital signature and encryption, shall satisfy a certain sequence of events when encoding and protecting message (data):

Encoding and signing the matrix with a digital signature (FIG. 2) along with establishing the main key-exchange protocol 401 must be implemented first.

Figure 4:
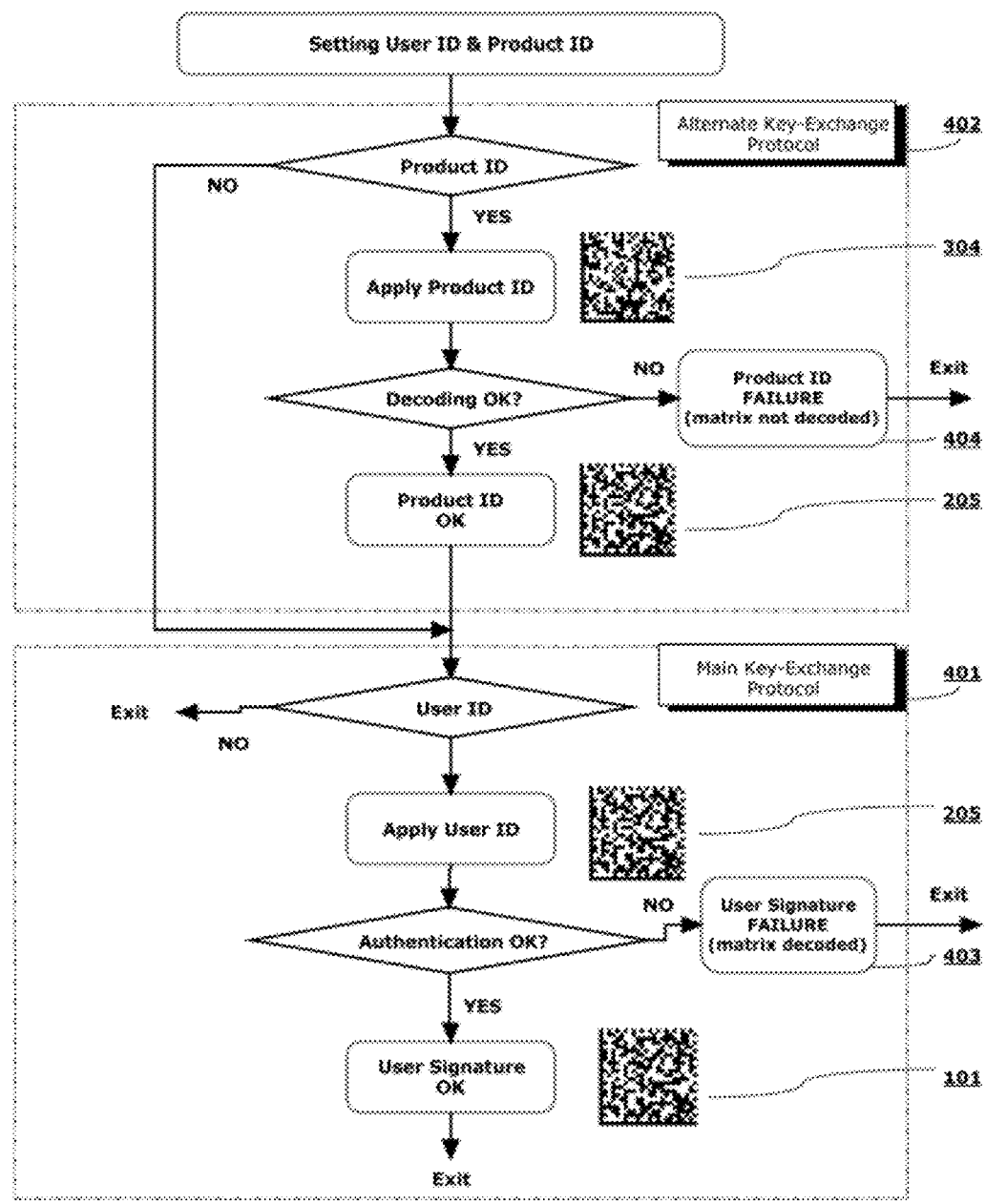
FIG. 4 depicts Block-diagram of the Protocol combining both digital signature authentication and 2D barcode protection.

Encrypting the signed matrix (FIG. 3) within the alternate key-exchange protocol 402 is completed thereafter Accordingly, matrix decoding and authentication should be done in reverse order. FIG. 4 depicts a block-diagram explaining the sequence of events on the receiving end when both protection mechanisms are employed—digital signature and encryption.

The signature/matrix is invalid if the process fails on either of the two steps 403-404 (matrix authentication may fail even if it was successfully decoded).

If matrix is counterfeit or tempered with, it can not be decoded within the alternate protocol 402, in the first place, indicating a counterfeiting attack on the system.

If the alternate protocol 402 was compromised, it is still not enough to decrypt the matrix 304, because the protection key 303 involves the "User ID" 209 as one of the components for its calculation. So, the attacker has to compromise the main protocol 401, as well to succeed.

In addition, even if both protocols 401 and 402 are compromised, the attacker may not enjoy the benefit of it for a long time. Unlike the User ID 209, the Product ID 301 is designed to be changeable on a regular basis, so if the problem with the protocol integrity arises it will be discovered promptly.

Furthermore, a protected matrixes (205, 304) looks very similar to an original matrix 101 (FIGS. 2-4). Without special efforts, for example, it may be difficult for anyone even to learn that the matrix 205 is "signed" (FIG. 2). Matrixes, circulating in a supply chain, for example, are never the ideal matrixes—they always have defects, irregularities, or damages. Those irregularities are randomized "by nature", and it is impossible to say without extensive investigation if some of these irregularities are "artificial", particularly because proposed algorithms employ randomization in the process of their generation. From this perspective the proposed digital signature algorithm posses steganography features, providing additional "safety" to the whole method.

Summarizing the points above, one can conclude that the value of breaking the proposed algorithm is similar to a mathematical problem that may be solvable but is very timely to complete, so the solution will provide no benefit once derived.

At the same time, by all estimates, the increase of processing time to run both algorithms (FIG. 4) on DSP platform would constitute not more than 1% compared with regular decoding algorithm.

We claim:

1. A method of authenticating and/or encrypting a 2D barcode comprising;
   providing a 2D barcode that is a representation of digits and characters, wherein the barcode includes redundancies;
   providing encoding and decoding software for encoding and decoding the 2D barcode, wherein the software includes error correction capability;
   constructing authentication tags from the redundancies in the barcode, wherein the tags are created using a randomization procedure;
   transforming the 2D barcode to include the authentication tags.

2. The method of claim 1 also comprising including in the transformed 2D barcode a sufficient number of authentication tags such that the error correction capability of the encoding and decoding software is exceeded and digits and characters represented by the 2D barcode cannot be decoded by the software.

3. The method of claim 2 additionally comprising including a decryption algorithm in the software that allows the digits and characters represented by the barcode to be decoded.

4. The method of claim 3 additionally including providing an authentication algorithm in the software wherein the authentication algorithm allows the transformed 2D barcode to be authenticated via the authentication tags.

5. The method of claim 1 additionally comprising including an authentication algorithm in the software wherein the authentication algorithm allows the transformed 2D barcode to be authenticated via the authentication tags.

6. The method of claim 5 wherein the digits and characters represented by the 2D barcode can be decoded by software that does not include the authentication algorithm.

7. The method of claim 1 wherein the size of the 2D barcode is not increased as a result of the transformation.

8. The method of claim 1 wherein the method is suitable for embedded processing.

9. The method of claim 1 wherein the authentication and/or encryption of the 2D barcode is steganographic.

* * * * *